June 6, 1933.  B. C. McCLURE  1,913,242
INORGANIC RESILIENT FIBROUS MASS
Filed July 16, 1931
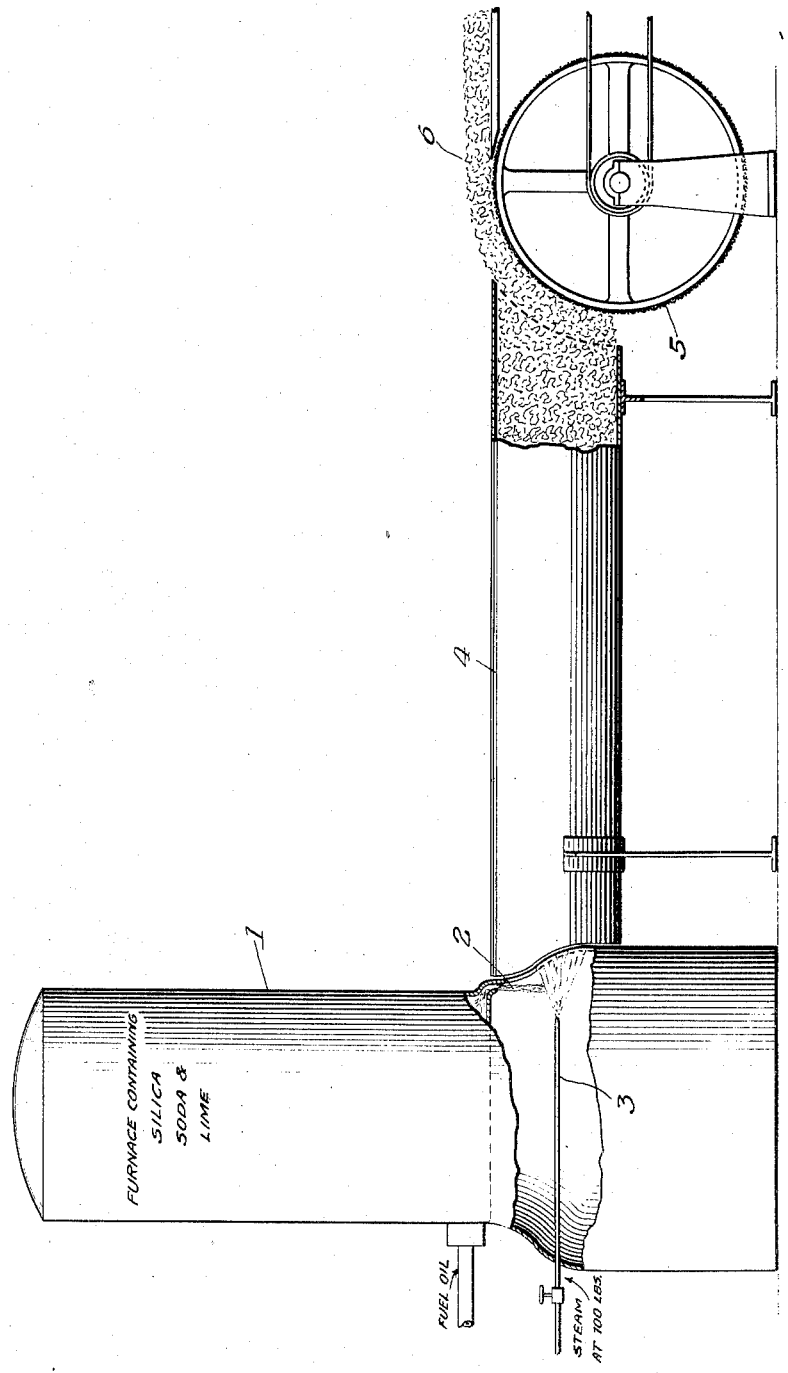
Witness:
R. B. Davison.
Inventor:
Benjamin C. McClure.
By Wilkinson, Huxley, Byron & Knight
Attys Patented June 6, 1933

1,913,242

UNITED STATES PATENT OFFICE

BENJAMIN C. McCLURE, OF CHICAGO, ILLINOIS, ASSIGNOR TO GUSTIN-BACON MANUFACTURING CO., OF KANSAS CITY, MISSOURI, A CORPORATION OF MISSOURI

INORGANIC RESILIENT FIBROUS MASS

Application filed July 16, 1931. Serial No. 551,303.

This invention relates in part to a new inorganic felted blanket consisting of fibers sufficiently long and resilient to cause them, when collected upon a surface, to become so felted and interlocked that they produce a structure which is sufficiently self-sustaining to enable the mass to be picked up as a blanket and placed into the position of its use, and having such inherent structural resiliency that when the mass is introduced between confines and under compression, it will automatically expand into contact with such confines and eliminate spaces thereat; the fibers themselves having a constituency which, neglecting impurities and other non-essentials, may be defined as a fusion solution of silica in an alkali earth metal of the sodium group, comparatively free from alumina and magnesia, but qualified by an alkali earth ingredient such as lime; the silica, earth metal and alkali earth being each present in a percentage which lies between approximately the limits hereinafter prescribed therefor and which, according to the present discovery, lend to the fibers of the mass physical characteristics that open up to the material a wide range of uses, and render the material in its service of those uses far superior to materials heretofore used therefor.

The invention further relates to the method whereby fibers of the constituency stated can be produced and deposited in felted form to produce a blanket with the structural characteristics aforesaid.

In addition to advantages such as those enumerated, the new material as well as the process by which it is produced, is particularly advantageous from the standpoint of the wide range of sources and therefore cheapness of the material from which it is produced, and especially the silica which enters into the constituency of the material in the proportion from about 50% upward; also because of the readiness with which the material lends itself to production by the physical action of a steam or other gaseous blast against a molten stream of the material; and because of the uniformity of product obtainable and the ease with which its texture and quality may be controlled by proper proportioning of its ingredients.

Taking, for instance, a silica source such as common shore sand and fusing it with any suitable source of soda in proportion suitable for making insoluble sodium silicate and including in the bath common calcium oxide in a sufficiently large proportion but not too large, it will lend a quality to the fused mixture which will cause it to respond to a steam or equivalent blast in the form of exceedingly fine, long, resilient fibers which, when collected under conditions that cause them to form a felted mass, will result in a light flossy bat having the inherent quality of mass integrity under stresses incident to normal handling and high mass resiliency and with such close intertwining of the fibers as to render the mass appropriate for such uses as heat insulation, filtration and the like; the mass integrity and degree of resiliency of the felted mass being such that notwithstanding the fineness and delicacy of the constituent fibers, it will not only retain its form indefinitely under its own weight and exert its resiliency to permanently fill a space in which it is confined, but it will, under appropriate compression, afford appreciable support to relatively thin facings or confines between which it may be desirable to locate the insulation, and thus open a channel of usefulness for which hitherto known inorganic fibrous insulating substances have not been available.

The accompanying drawing is an elevational view of instrumentalities individually conventional but new in their assembly and combined use, and appropriate to the performance of the operation and production of the product herein described.

As a typical formula appropriate to the production of the new material constituting one part of this invention, although not a formula that is to be taken as a limitation as to specific materials selected or the proportions used, take 51% of common silica sand, 26% of soda and 23% of lime and heat the same in a furnace 1 to about 2600° F., then draw off from the furnace a small stream 2 of the molten mass of a diameter approximating that of a lead pencil and discharge horizontally across this stream of molten material, steam from a jet 3 or jets under a pressure of, say, 100 pounds or more to the square inch, confine the resultant shreds of material by and bear them upon the vehicular blast through a tunnel 4 and against a reticulated collecting surface 5, and the result will be the production of a felted mass or bat of flossy inorganic material. This material may be discharged immediately into a large room from which it may subsequently be gathered when sufficiently accumulated, but I prefer to discharge it immediately into the tunnel or conduit 4, for instance, a sheet metal pipe of about 2 feet in diameter and of sufficient length to permit the material to freeze or solidify while suspended in the gaseous vehicle by which it is borne, and cause the conduit to discharge, at its distant end, against a cylinder 5 of woven wire of about one-quarter inch mesh which is slowly revolved at a rate that will cause it to accumulate and discharge the desired thickness of bat or felt 6, or such thickness as will readily accumulate without interrupting to too great a degree the flow of the vehicle through the bat.

The quality of the sand is relatively unimportant so long as it is mainly silica, but I prefer sand which is low in alumina, magnesia and the like as compared with materials heretofore employed for blasting into fibrous form. The proportion of soda and lime may vary within limits. I have obtained measurably good results with the silica yielding ingredient as low as about 50%, when the soda yielding ingredient was about 24% and the lime about 26%; but with this proportion of lime the product was of shorter fiber and dusty, which conditions are not so desirable for most purposes for which the material is useful.

I have also used a formula in which the silica source was around 63%, the sodium 20% and the lime 17%, and while this produced a material which would be useful for some purposes, the fiber was too coarse and the felting or batting effect was not so good for purposes such as heat insulation, filtration and the like.

Again, a formula consisting of 60% silica yielding material, 21% of soda yielding material and 19% of lime provided a fused product that was slacker in consistency and a finished product of much finer fiber than was produced by the formula in which the corresponding ingredients were in the ratio of 63—20 and 17.

Permissible limits for the percentages of ingredients found by experiment are from about 65 to about 50% for the silica source, with the soda and lime ingredients together aggregating from 35 to 50%, or soda from 20 to 27% and lime from 15 to 24%.

The new substance is in the nature of a siliceous solution containing an alkaline earth, with the alkaline earth in a percentage of from about 18 to about 22% for the best results. Formulas thus far given, being in terms of commercially available materials used for making up the batch and including in their volume ingredients additional to the essential ingredients that identify the finished product, are decidedly different from formulas of the finished material. And especially is this so since, on the one hand, some parts of the essential ingredients are lost when the materials are subjected to the heat of the furnace, and, on the other hand, some small part of the finished product is made up of the additional ingredients referred to. Hence, the formulas of permissible limits for finished material corresponding to those just stated for batch materials, are—silica ($SiO_2$)—about from 72% to 58%; soda ($Na_2O$)—about from 13% to 20%; and lime ($CaO$)—about from 9% to 16%; and any remainder of the 100% of the total finished product being accounted for mainly by the aforesaid additional ingredients of the batch materials.

In this specification, the terms "lime", "soda" or "silica," when the context indicates a reference to batch materials, are intended to indicate either calcium oxide, sodium oxide, or silicon dioxide, or any available materials which, when subjected to the furnace heat employed, will yield said oxides, respectively; and where the context indicates the finished product, said terms are to be taken as indicating the said oxides themselves.

As compared with natural siliceous rock melted and blasted, the present invention utilizes larger percentages of silica, greatly reduced percentages of lime, and preferably avoids such impurities as alumina and magnesia. For instance one well known so-called "rock wool" compound, the physical form of which is that of a very short, closely packing, non-resilient fiber of little or no mass integrity, analyzes (in percentages) silica sand 40., aluminum oxide 17., calcium oxide 21., magnesium oxide 13., iron oxide 6. and miscellaneous ingredients 3.

While in a typical procedure referred to herein by way of illustration, I have mentioned a temperature of 2600° F., it is to be understood that a higher temperature may be used, particularly if it should be desired to increase the percentage of silica. So also lower temperatures may be used with proper modification of percentages of ingredients.

Only a small amount of resiliency and except when matted down with an added adhesive, slight mass integrity have been obtainable heretofore in mineral insulations, and those made from diatomaceous earth and 85% magnesia have practically none. Those from asbestos felts or fiber have a very small amount of resiliency; and even those made from rock and mineral wool do not possess nearly enough to give to the insulation, qualities productive of the results which are attained under the teachings of this invention which are of very great benefit in the art of insulation.

The present invention contemplates a blanket constructed of felted mineral fibers, which blanket, even when the felting is of relatively low density, will have sufficient structural integrity to adapt it as an integral unit, independently of a container, form or other sustaining means and without impairment of its structural shape, to be manipulated into the space of its use; and having sufficient inherent resiliency as a mass to cause it to expand itself against the confines of spaces into which it is introduced, to a degree that will enable the material, in a vertical position or position at an angle greater than the angle of repose, to sustain its weight largely by friction between it and its said confines and relieve the load which would tend to cause it to settle. In other words, the material will not settle as readily as if it were not able to expand itself forcibly against its confining walls. Filling the same space with ordinary mineral fiber can be made permanent only by crowding in large masses at high density. Another effect of highly resilient mineral fiber expanding itself against the confines of an insulating space is to make the walls or confines seem more solid or substantial, and to back up such walls where relatively thin so that they will be less liable to suffer from handling and shipment. For example, gas or electric stoves, refrigerators and various types of containers which might be made of comparatively thin material, when handled, have a tin-like, cheap or unsubstantial sound or feel which is not necessarily due to weakness but to lack of backing against the thin wall or surface.

By placing against or between two such surfaces the resilient material herein described, which has the quality of expanding against the walls or confines, the latter are made more substantial, sound better when tapped, and carry better in handling or shipping.

The present invention further contemplates a mineral material of such extreme mass resiliency, resulting from its make-up and process of felting, that for insulating, filtering, acoustical and other uses, its density, may be varied in the act of applying it without detracting from its self-sustaining and space-filling qualities, so that the density best suited for any particular condition is readily obtained by regulating the pressure on the confining walls and varying the space between them.

The degree of mass resiliency attainable in the material of the present invention may be realized from the fact that it may be compressed to around one-third its thickness and when released will expand approximately to its original thickness or nearly 300%. If we take, for instance, a piece of the material that is 3 or 4 inches in thickness and compress it to 1 inch in thickness and then release it, it will regain a thickness of 3 inches or greater.

I claim:

1. As a new article of manufacture, a felted body constructed of fibers of silica, alkali metal and alkali earth; said fibers having length and fineness that cause them to felt themselves into the said body and give to the body integrity of mass structure that enables it to retain its shape during manipulation and while in position of use.

2. A felted body as described in claim 1, in which the fibers are blasted fibers.

3. A felted body as described in claim 1, having inherent mass resiliency which retains the dimensions of the body under various degrees of compression and thereby renders the body adjustable in density to suit varying conditions of service.

4. A felted body as described in claim 1, in which the proportions of silica, alkali metal and alkali earth are from about 72% to about 58% silica, while the alkali metal and alkali earth combined constitute from about 22% to about 36% of the said total.

5. A felted body as described in claim 1, in which the silica exists in the proportion of between about 72% and about 58%, the alkali metal is from about 13% to about 20%, and alkali earth is from about 9% to about 16%.

6. A felted body as described in claim 1, consisting of a fusion of rock or other silica-bearing mineral that contains over 90% silica, with an alkali metal and an alkali earth and in which the alkali earth is present in the finished product in a proportion that is less than 20% of the whole.

7. A felted body as described in claim 1, consisting of a fusion of rock or other silica-bearing mineral that contains over 90% silica, with an alkali metal and an alkali earth in which the alkali earth is present in the finished product in a proportion that is less than 20% of the whole, and the silica is over 60% of the whole.

8. A felted body as described in claim 1, in which the silica exists in a proportion which is between 72% and 58% of the whole, the soda is between 13% and 20% of the whole, and the lime is about 9%.

9. A fusion of materials bearing silica, soda and lime and existing as a felted body of fine fibers having inherent mass resiliently and integrity of mass formation; the batch proportions of said materials being about 60% for the silica-bearing material, about 21% for the soda-bearing material, and about 19% for the lime-bearing material.

Signed at Chicago, Illinois, this 14th day of July, 1931.

BENJAMIN C. McCLURE.